US009229210B2

(12) United States Patent
Fox et al.

(10) Patent No.: US 9,229,210 B2
(45) Date of Patent: Jan. 5, 2016

(54) TISSUE SPECIMEN STAGE FOR AN OPTICAL SECTIONING MICROSCOPE

(71) Applicants: William J. Fox, Rochester, NY (US); Christopher C. DiStasio, Rochester, NY (US)

(72) Inventors: William J. Fox, Rochester, NY (US); Christopher C. DiStasio, Rochester, NY (US)

(73) Assignee: CALIBER IMAGING AND DIAGNOSTICS, INC., Rochester, NY (US)

( * ) Notice: Subject to any disclaimer, the term of this patent is extended or adjusted under 35 U.S.C. 154(b) by 247 days.

(21) Appl. No.: 13/778,083

(22) Filed: Feb. 26, 2013

(65) Prior Publication Data

US 2013/0222899 A1    Aug. 29, 2013

Related U.S. Application Data

(60) Provisional application No. 61/603,364, filed on Feb. 26, 2012.

(51) Int. Cl.
*G02B 21/26* (2006.01)
*G02B 21/34* (2006.01)

(52) U.S. Cl.
CPC .............. *G02B 21/26* (2013.01); *G02B 21/34* (2013.01)

(58) Field of Classification Search
CPC ........ G02B 21/24; G02B 21/26; G02B 21/34; G01N 2001/315; G01N 1/28; G01N 21/9515; G01N 2800/20
USPC ................. 359/362, 368, 391–393, 396–398; 356/244, 246; 73/864.83, 864.91; 435/288.3, 288.7, 305.1; 436/46
See application file for complete search history.

(56) References Cited

U.S. PATENT DOCUMENTS

| 1,002,910 A | 9/1911 | Foote |
|---|---|---|
| 1,991,983 A | 2/1935 | Newman |

(Continued)

FOREIGN PATENT DOCUMENTS

| DE | 1472294 | 2/1969 |
|---|---|---|
| DE | 3323742 A1 | 1/1985 |
| DE | 4423935 A1 | 1/1996 |

OTHER PUBLICATIONS

Rajadhyaksha, Milind et al., "In vivo Confocal Scanning Laser Microscopy of Human Skin: Melanin Provides Strong Contrast," The Journal of Investigative Dermatology, vol. 104, No. 6, pp. 946-952, Jun. 1995.

(Continued)

*Primary Examiner* — Stephone B Allen
*Assistant Examiner* — Ryan Dunning
(74) *Attorney, Agent, or Firm* — Kenneth J. Lukacher Law Group

(57) ABSTRACT

A tissue specimen stage is provided having a window with surface curvature upon which an excised tissue specimen is locatable, a carriage having a tissue specimen receptacle to which the window is mounted, and a platform supporting the carriage and presenting the window to the objective lens of an optical sectioning microscope. The carriage is mounted to the platform for movement along two rotational axes so that the carriage's movement follows the curvature of all or part of the window while maintaining the same optical geometry of the window with respect to the objective lens. The window has surface curvature adapted to at least approximate the shape or curvature of the non-histologically prepared tissue specimen to be placed thereupon.

20 Claims, 13 Drawing Sheets

(56) References Cited

U.S. PATENT DOCUMENTS

| | | |
|---|---|---|
| 2,942,520 A | 6/1960 | Rose |
| 3,202,049 A | 8/1965 | Bond |
| 3,510,194 A | 5/1970 | Connelly |
| 3,532,412 A | 10/1970 | Miller |
| 3,551,023 A | 12/1970 | Brackett |
| 3,556,633 A | 1/1971 | Mutschmann et al. |
| 3,648,587 A | 3/1972 | Stevens |
| 3,736,042 A | 5/1973 | Markovits et al. |
| 3,879,106 A | 4/1975 | McCormick |
| 3,904,781 A | 9/1975 | Henry |
| 4,159,875 A | 7/1979 | Hauser |
| 4,208,101 A | 6/1980 | Trapp et al. |
| 4,545,831 A | 10/1985 | Ornstein |
| 4,744,643 A | 5/1988 | Taylor |
| 4,752,347 A | 6/1988 | Rada |
| 4,965,441 A | 10/1990 | Picard |
| 4,974,952 A | 12/1990 | Focht |
| 5,002,735 A | 3/1991 | Alberhasky et al. |
| 5,034,613 A | 7/1991 | Denk et al. |
| 5,073,857 A | 12/1991 | Peters et al. |
| 5,076,680 A | 12/1991 | Arjarasumpun |
| 5,103,338 A | 4/1992 | Crowley et al. |
| 5,120,953 A | 6/1992 | Harris |
| 5,156,150 A | 10/1992 | Lary |
| 5,171,995 A | 12/1992 | Gast et al. |
| RE34,214 E | 4/1993 | Carlsson et al. |
| 5,257,128 A | 10/1993 | Diller et al. |
| 5,296,963 A | 3/1994 | Murakami et al. |
| 5,311,358 A | 5/1994 | Pederson et al. |
| 5,367,401 A | 11/1994 | Saulietis |
| 5,383,234 A | 1/1995 | Russell |
| 5,383,472 A | 1/1995 | Devlin et al. |
| 5,503,741 A | 4/1996 | Clark |
| 5,532,874 A | 7/1996 | Stein |
| 5,554,151 A | 9/1996 | Hinchliffe |
| 5,609,827 A | 3/1997 | Russell et al. |
| 5,675,700 A | 10/1997 | Atwood et al. |
| 5,681,741 A | 10/1997 | Atwood et al. |
| 5,719,700 A | 2/1998 | Corcuff et al. |
| 5,788,639 A | 8/1998 | Zavislan et al. |
| 5,812,312 A | 9/1998 | Lorincz |
| 5,836,877 A | 11/1998 | Zavislan |
| 5,870,223 A | 2/1999 | Tomimatsu |
| 5,880,880 A | 3/1999 | Anderson et al. |
| 5,939,251 A | 8/1999 | Hu |
| 5,978,695 A | 11/1999 | Greenwald et al. |
| 5,995,283 A | 11/1999 | Anderson et al. |
| 5,995,867 A | 11/1999 | Zavislan et al. |
| 6,048,723 A | 4/2000 | Banes |
| 6,151,127 A | 11/2000 | Kempe |
| 6,252,705 B1 | 6/2001 | Lo et al. |
| 6,272,235 B1 | 8/2001 | Bacus et al. |
| 6,330,106 B1* | 12/2001 | Greenwald et al. ........... 359/398 |
| 6,358,475 B1 | 3/2002 | Berndt |
| 6,360,115 B1 | 3/2002 | Greenwald et al. |
| 6,411,434 B1* | 6/2002 | Eastman et al. ............... 359/398 |
| 6,413,252 B1 | 7/2002 | Zavislan |
| 6,444,992 B1 | 9/2002 | Kauvar et al. |
| 6,493,460 B1 | 12/2002 | MacAulay et al. |
| 6,577,394 B1 | 6/2003 | Zavislan |
| 6,720,547 B1 | 4/2004 | Rajadhyaksha et al. |
| 6,745,067 B1 | 6/2004 | Zavislan et al. |
| 6,856,458 B2 | 2/2005 | Greenwald et al. |
| 6,937,886 B2 | 8/2005 | Zavislan |
| 7,047,064 B1 | 5/2006 | Zavislan et al. |
| 7,194,118 B1 | 3/2007 | Harris et al. |
| 7,227,630 B1 | 6/2007 | Zavislan et al. |
| 7,394,592 B2 | 7/2008 | Fox et al. |
| 7,813,788 B2 | 10/2010 | Zavislan et al. |
| 7,835,013 B2 | 11/2010 | Jones et al. |
| 7,847,949 B2 | 12/2010 | Tearney et al. |
| 7,864,996 B2 | 1/2011 | Hemmer et al. |
| 8,115,918 B2 | 2/2012 | Zavislan et al. |
| 8,121,670 B2 | 2/2012 | Zavislan |
| 8,149,506 B2 | 4/2012 | Eastman et al. |
| 8,254,022 B2 | 8/2012 | McMurtry et al. |
| 2004/0152204 A1 | 8/2004 | Gauthier |
| 2009/0286305 A1* | 11/2009 | Chu ............................. 435/270 |
| 2010/0265576 A1* | 10/2010 | Borucki ....................... 359/395 |

OTHER PUBLICATIONS

Rajadhyaksha, Milind et al., "Confocal laser microscope images tissue in vivo," Laser Focus World, pp. 119-127, Feb. 1997.

Schmitt, Joseph M. et al., "Optical characterization of dense tissues using low-coherence interferometry," Proc. of SPIE, vol. 1889, pp. 197-211, 1993.

Caspers, Peter J. et al., "In Vivo Confocal Raman Microspectroscopy of the Skin: Noninvasive Determination of Molecular Concentration Profiles", Journal of Investigative Dermatology, vol. 116, No. 3, pp. 434-442, Mar. 2001.

Gross, Kenneth G. et al., "Mohs Surgery: Fundamentals and Techniques", Mosby, p. 94, 1999.

Macro Confocal Microscope System AZ-C1, Nikon Corporation, 2009.

VivaScope(R) 1500/3000, MAVIG GmbH, 2011.

VivaScope(R), MAVIG GmbH, 2011.

VivaScope(R) 2500 Multilaser, MAVIG GmbH, 2010.

PlLine(R) Ultrasonic Piezo Motors, OEM Motors, Technical Data, Physik Instrumente GmbH & Co., at least as earlier as Feb. 23, 2012.

Piezo LEGS(R) Motor Elements, Micromo, printed from http://www.micromo.com/piezo-legs-motor-elements.aspx, Feb. 23, 2012.

Gonio Way, Isotech, Inc., at least as earlier as Feb. 23, 2012.

* cited by examiner

TISSUE SPECIMEN STAGE FOR AN OPTICAL SECTIONING MICROSCOPE

This application claims priority to U.S. Provisional Application No. 61/603,364 filed Feb. 26, 2012, which is incorporated herein by reference.

FIELD OF THE INVENTION

The present invention relates to a tissue specimen stage for an optical sectioning microscope, and particularly to a stage (and method) for moving a window with surface curvature adapted to the curvature or shape of the edges and surfaces of a non-histologically prepared tissue specimen. The window is mounted to a container or tissue specimen receptacle that is positioned in a carriage movable along two rotational axes so that different locations along the window are presentable to the objective lens of a optical sectioning microscope for imaging the tissue specimen through the window. Although the present invention is directed for use with a confocal microscope, the stage may be used by other optical sectioning microscopes operable by two-photon or optical coherence tomography as well as microscopes that can detect the presence of endogenous fluorescence of tissue, fluorescence from exogenous compounds or Raman spectroscopic signatures of tissue.

BACKGROUND OF THE INVENTION

In Mohs micrographic surgery, tissue having a tumor, typically a carcinoma on the skin of the head or neck, is excised from a patient under microscopic guidance. The excised tissue specimen, often called a biopsy, is horizontally sliced to provide thin tissue sections that are then histologically prepared on slides. The slides are reviewed under a microscope to determine whether the tumor is fully contained in the excised tissue. This is indicated by the absence of the tumor in the edges or margins of the excised tissue. If the tumor is not fully contained in the excised tissue, additional tissue from the patient is excised and the procedure is repeated until all tissue sections taken indicate the tumor has been removed from the patient. Mohs surgery permits removal of a tumor with maximum preservation of normal surrounding tissue. Mohs surgery is described in the book entitled MOHS SURGERY FUNDAMENTALS AND TECHNIQUES (Kenneth G. Gross, M.D. et al. eds., 1999).

To prepare each tissue specimen in Mohs surgery, multiple sections or slices are manually made with a microtome, where each section is planar and parallel to each other. Often the tissue specimen is first frozen to make the tissue easier to manipulate and cut by the microtome. However, since numerous sections must be made from each tissue specimen and then histologically prepared on slides, this procedure is both tedious and time consuming.

U.S. Pat. No. 4,752,347 provides a method and apparatus for preparing a tissue specimen for sectioning for Mohs surgery. The patent describes placing an excised tissue specimen on a platform, applying a flexible plastic membrane over the tissue specimen, and evacuating the area between the membrane and the tissue specimen. This retracts the membrane onto the platform and pushes the edges of the tissue specimen into a planar orientation parallel to the platform. While under the pressure of the membrane, the tissue sections may be manipulated by an operator through the membrane until the desired orientation is obtained. The edges of the tissue specimen are thus oriented to flatten the edges of the specimen down. The specimen is then frozen, peeled away from the platform, and sectioned by a microtome. Since the edges of the specimen are oriented planar when sectioned by the microtome, a single section can be made having the edges of interest in Mohs surgery. This procedure is adequate for obtaining a section which can be placed on a slide for review under a microscope, but is not useful with optical imaging techniques, such as provided by confocal microscopes, which can examine a surgically exposed tissue specimen without the need for traditional microtome sectioning or slide preparation.

Confocal microscopes optically section tissue to produce microscopic images of tissue sections without requiring histological preparation of the tissue on slides (i.e., slicing, slide mounting, and staining). An example of a confocal microscope is the VivaScope® manufactured by Caliber Imaging Diagnostics, Inc. (formally Lucid Inc.) of Henrietta, N.Y. Other examples of confocal microscopes are described in U.S. Pat. Nos. 5,788,639, 5,880,880, and 7,394,592, and in articles by Milind Rajadhyaksha et al., "In vivo Confocal Scanning Laser Microscopy of Human Skin: Melanin provides strong contrast," The Journal of Investigative Dermatology, Volume 104, No. 6, June 1995, and Milind Rajadhyaksha and James M. Zavislan, "Confocal laser microscope images tissue in vivo," Laser Focus World, February 1997, pages 119-127. Further, optically sectioned microscopic images of tissue can be produced by optical coherence tomography or interferometry, such as described in Schmitt et al., "Optical characterization of dense tissues using low-coherence interferometry," Proc. of SPIE, Volume 1889 (1993), or by a two-photon laser microscope, such as described in U.S. Pat. No. 5,034,613. Raman spectral signatures of molecules can be measured in the skin with optical sectioning microscopy, such as described by Peter J Caspers et al., "In Vivo Confocal Raman Microspectroscopy of the Skin: Noninvasive Determination of Molecular Concentration Profiles", Journal of Investigative Dermatology (2001) 116, 434-442. Additionally confocal fluorescence microscopes, such as Nikon Instruments AZ-C1 Macro Laser Confocal Imaging System that can image endogenous tissue fluorescence or the fluorescence of exogenous compounds that are applied to the tissue.

One problem with optical sectioning a tissue specimen for Mohs surgery such as by confocal microscope is that the tissue specimen is generally too thick, for example 2-3 mm, to image the edges of the specimen to determine if the specimen contains all of the tumor. Edges refer to areas along the tissue specimen where the cut was made in order to remove the tissue specimen from the patient that may or may not have the margins of the tumor. Often the excised tissue surface is generally convex. It is this convex surface that is needed to be examined to determine if tumor is present in the specimen. Typically, a confocal microscope is limited to producing adequate images of tissue sections at 100-200 microns. Thus, it would be desirable to optically image a tissue specimen in which the edges of the tissue specimen are oriented planar against an optically transparent surface through which the specimen can be optically sectioned.

To overcome this problem, U.S. Pat. No. 6,411,434 describes a cassette having a base member with a rigid optically transparent planar window upon which a tissue specimen is situated, and a pliable plastic membrane locatable over the window and a substantial portion of the base member. With the tissue specimen between the membrane and the window, the edges of the tissue specimen along the sides of the specimen are manually positioned through the membrane so that they lie planar against the window along with the bottom surface of the specimen. The edges may be retained in that position by multiple bonds formed between the membrane and window at points or locations around the tissue specimen. The specimen is imagible by an optical sectioning microscope through the window of the cassette. Although useful, manual positioning needs a skilled technician using a probe to reshape the edges of a thick tissue specimen (e.g., 2-3 mm) to be planar against the planar window surface without puncturing the membrane is a delicate procedure, which if not performed properly can damage the tissue specimen's edges. Thus, it would be desirable to optically image a thick tissue specimen in which the edges needed to be imaged are oriented against an optically transparent window surface through which the specimen can be imaged by an optical sectioning microscope without requiring the need for manually position each of the edges around the specimen so that such edges can be imaged by the microscope.

SUMMARY OF THE INVENTION

Accordingly, it is an object of the present invention to provide a window with surface curvature which approximates the shape or curvature of the edges of a tissue specimen when located thereupon so that such edges can contact the window surface, thus avoiding the need to manually position each of the edges.

It is another object of the present invention to provide a stage having a window moveable with respect to objective lens of a microscope while maintaining the same optical geometry between the window and the objective lens despite the curvature of the window.

Briefly described, the present invention embodies a tissue specimen stage having a window with surface curvature upon which an excised tissue specimen is locatable, a carriage to which the window is mounted, and a platform supporting the carriage and presenting the window to the objective lens of an optical sectioning microscope, i.e., a microscope that can optically form microscopic images of one or more sections under a tissue surface. The carriage is mounted to the platform for movement along two rotational axes so that the carriage's movement follows the curvature of all or part of the window while maintaining the same optical geometry of the window with respect to the objective lens. The window's surface curvature is adapted to at least approximate the shape or curvature of the non-histologically prepared tissue specimen to be placed thereupon.

Preferably, the window is rotationally symmetric by having the same radius of curvature, at least along the surface of the window having the tissue specimen. However, the window may instead have aspheric surface curvature, in which two or more regions of the window may be of different radius of curvature, and if so, the distance between the objective lens and the window is adjusted to maintain the same optical geometry between the window and the objective lens so that focus of the microscope is maintained as the window moves with respect to the objective lens. This may be achieved by moving the objective lens towards or away from the window, or moving the entire platform supporting the window, via the carriage, towards or away from the objective lens so as to maintain focus. Different windows may be selected for the shape of such edges desired to be imaged by the optical sectioning microscope. The axes of rotation of the stage are aligned with the surface curvature (radius) of the window in the case of a rotational symmetric window so that the stage's rotationally motion follows the curvature of the window. However, in the case of a window with aspheric surface curvature, the axes of rotation of the stage are aligned along one of the different radius regions of the window, i.e., preferably such regions representing the majority of the window surface desired to be imaged through.

To enable carriage movement, the carriage has two orthogonal carriage members in which each member is mounted for movement along one of two the rotational axes. A first carriage member rides along a first rotational axes with respect to the platform, while the second carriage member rides along the second rotational axes with respect to the first carriage member. To control movement of the carriage, two piezoelectric motors may be used, where one motor is fixed to the first carriage member and moves the second carriage member along the first rotational axis, and the other motor is fixed to the second carriage member and move the first carriage member along the second rotational axis.

Movement of the carriage may also be provided by moving a coupler fixed to one of the carriage members in which movement of the coupler along x, y orthogonal axes corresponding to the orthogonal carriage members moves the carriage members along their respective rotational axes. An x-y translation mechanism or stage is then mounted to the carriage via the coupler for moving the carriage.

Preferably, the window is disposed in an opening along the bottom wall of a container into which a compression member is received, which uniformly applies pressure with respect to the curvature of the window in response to a clamp member. Such pressure is sufficient to assure contact of the edges of the tissue specimen against the window. A mechanism for retaining the clamp member position to maintain such pressure during imaging may be provided. The container is positioned in the carriage so that the window of the container is in view of the objective lens for imaging by the optical sectioning microscope.

This container represents a tissue specimen receptacle having a window with substantial surface curvature adapted to at least approximate a portion of the surface curvature of a non-histologically prepared tissue specimen when placed thereupon. Such portion preferably is one of the edges of the tissue specimen, i.e., areas along the tissue specimen where a cut was made in order to remove (excise) the tissue specimen from a patient. By then imaging at least such portion of the tissue specimen through the window by an optical sectioning microscope, the microscope can produce image(s) for pathological examination of the tissue specimen.

The present invention further provides a method for presenting an excised tissue specimen to an objective lens of a microscope comprising the steps of: rotating a window having a surface with curvature upon which an excised tissue specimen is locatable along two rotational axes following of all or part of the curvature of the surface, and supporting the window with respect to an objective lens of a microscope. The rotating step enables the optical geometry to be maintained between the window with respect to the objective lens.

BRIEF DESCRIPTION OF THE DRAWINGS

The foregoing features and advantages of the invention will become more apparent from a reading of the following description in connection with the accompanying drawings, in which.

DETAILED DESCRIPTION OF INVENTION

Figure 1A:
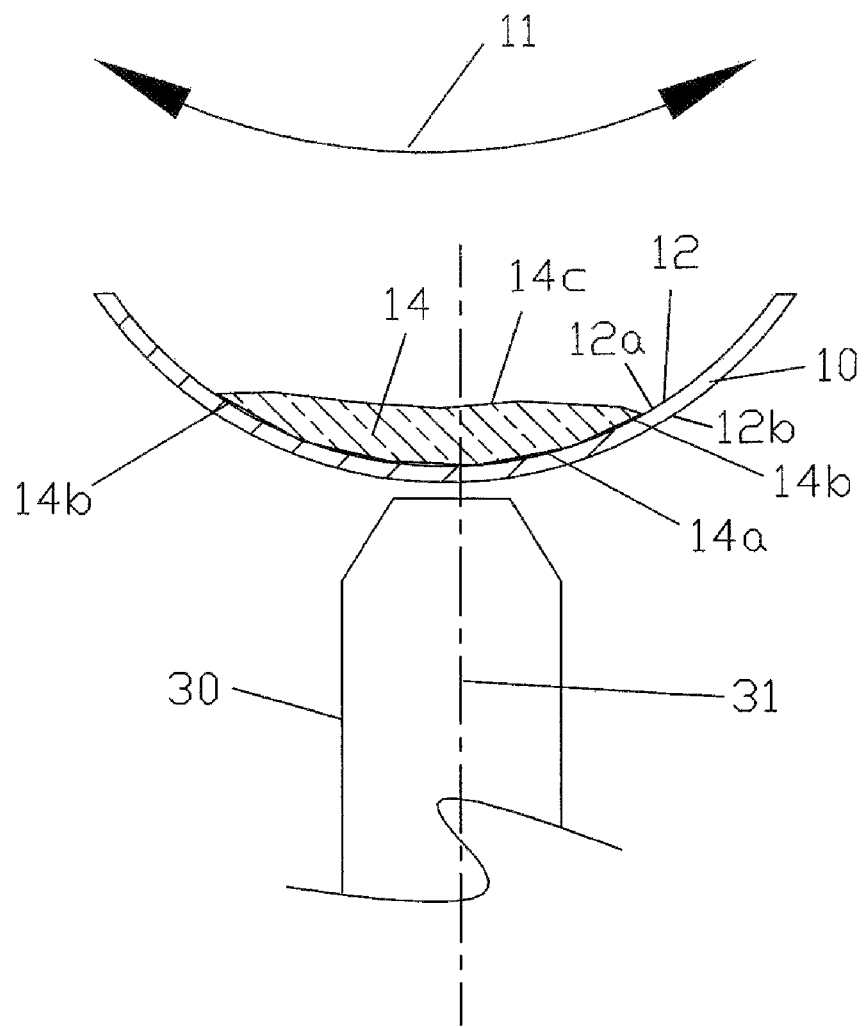
FIG. 1A is a cross-sectional view of a window utilized by the tissue specimen stage of the present invention having surface curvature, and an example of a tissue specimen, such as typical of an excised tissue from Mohs surgery, located upon the window, and an objective lens of an optical sectioning microscope shown centered with respect to the window.

Referring to FIG. 1A, an example of a window 10 of the present invention is shown having a surface 12 with curvature approximating the shape of the edges 14a and 14b of a tissue specimen 14 when located upon surface 12. Preferably window 10 is rotationally circular symmetric along spherical or concave surface 12. The lower edge 14a and side edges 14b of tissue specimen 14 face surface 12 of window 10, which has a degree of curvature complementary to edges 14a and 14b so that such surfaces can readily contact surface 12 as needed without require individual manual manipulation of side edges 14b. If needed, pressure may be applied onto the top edge 14c of the tissue specimen toward surface 12, such as described below. Tissue specimen 14 and its edges 14a and 14b may be a tissue specimen with edges of interest in removing a tumor, such as in Mohs surgery.

Although the degree of curvature of the window is complementary to edges 14a and 14b so that such surfaces can contact surface 12 without require individual manual manipulation of side edges 14b. Sometimes this contact does not entirely occur along all edges as desired. In this case, while all edges 14a and 14b at least substantially lie flat against the window when first placed thereupon, minor manual manipulation may be performed if a small fold inadvertently occurs along an edge.

Figure 3A:
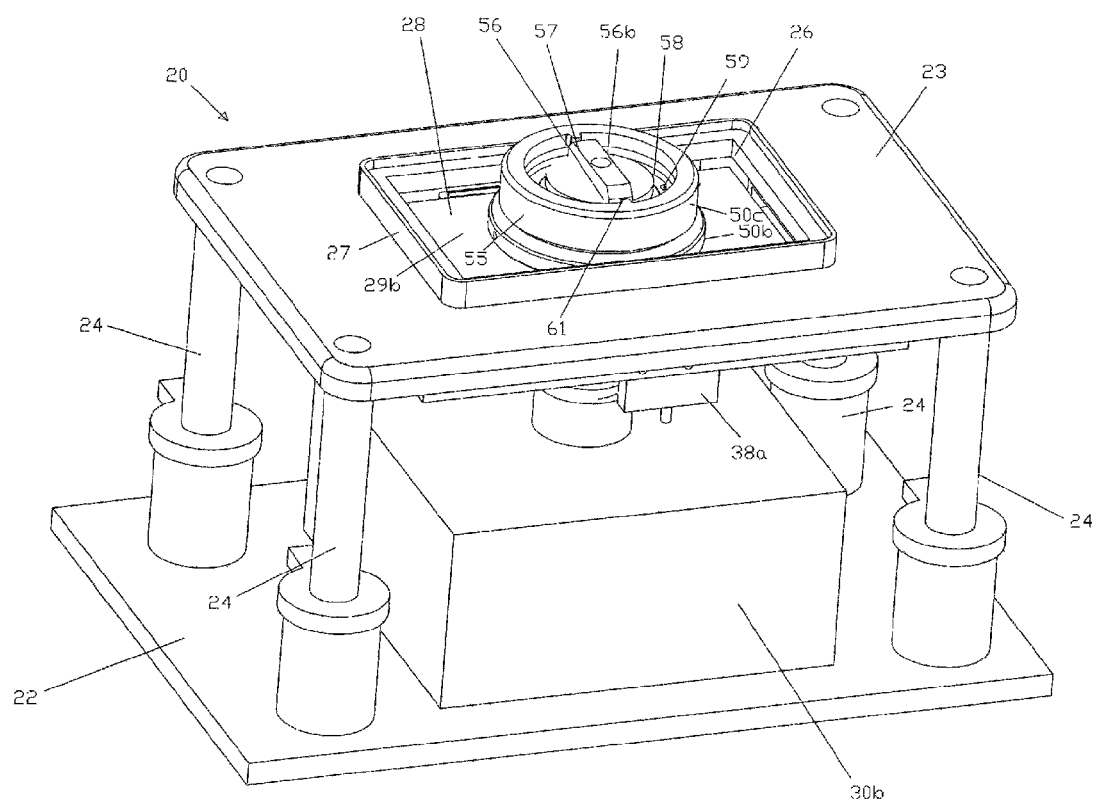
FIG. 3A is a perspective view of the stage of the present invention having the container of FIG. 1B, the window of FIG. 1A, and a microscope head situated below the carriage of the stage.
Figure 3B:
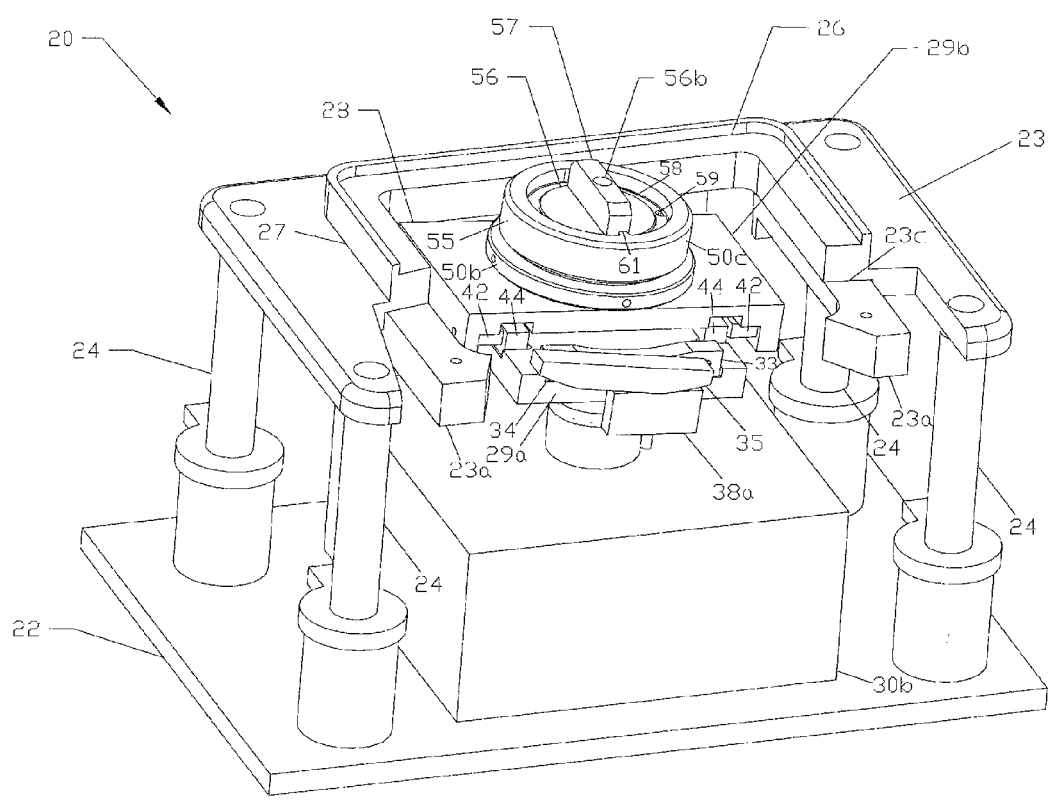
FIG. 3B is the same perspective view of FIG. 3A broken away to show the side of the movable carriage of the stage.
Figure 3C:
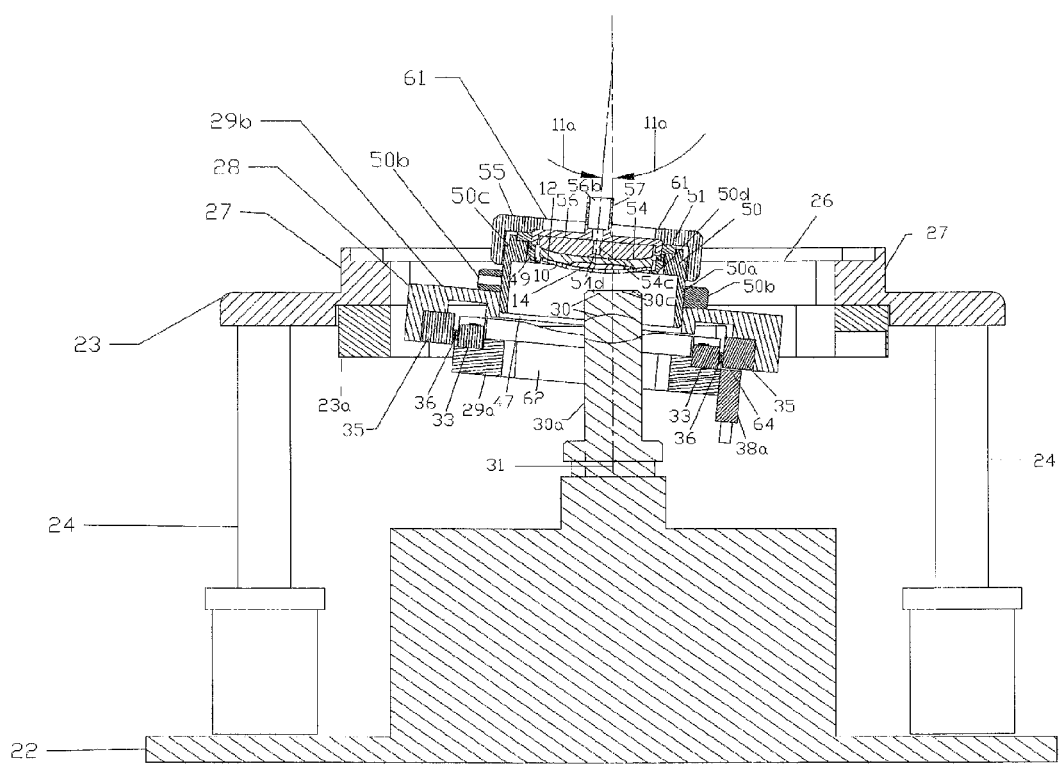
FIG. 3C is a cross-sectional view of the stage of FIG. 3A.

Window 10 is preferably movable along two rotational axes or dimensions so that different locations of the tissue specimen 14 are presentable to an objective lens 30 as needed during imaging while maintaining the optical geometry shown in FIG. 1A as shown for example in FIG. 3C. Objective lens 30 is part of the optics of an optical sectioning microscope, such as a confocal microscope, OCT microscope or two-photon microscope such as described earlier. The movement of the window is enabled by a stage 20 described later below. Motion of the window is controlled such that the window surface adjacent to the tissue is locally perpendicular to the optical axis of the objective lens. The distance between the window and the objective lens is adjusted so that the image of the section being captured is nominally at the window surface 12 adjacent to the tissue specimen. As shown in FIG. 1A, surface 12 may represent a first surface of window 10, and window 10 further has a second surface opposite such first surface 12 which preferably follows the curvature of the first surface, where such second surface is presentable to objective lens 30. Such first and second surfaces of window 10 are numbered 12a and 12b, respectively, in FIG. 1A.

When it is desired to image inside the tissue an offset can be added to provide sectional imaging inside the tissue specimen. Since window 10 is rotationally symmetric, arrow 11 may represent a first rotational axis or dimension, and rotating the window 90 degrees with respect to the plane of the FIG. 1A, arrow 11 now illustrates the second rotational axis or dimension. Typically, the curvature of Mohs surgery tissue specimens are generally the same as the curvature of surface 12, and edges 14a and 14b may or may not contact surface 12 when first applied (non-compressed) onto surface 12. Such contact to surface 12 by edges 14a and 14b can be assured by a compression member 54 applying uniform pressure upon upper edge 14c of the tissue specimen 14 responsive to force applied by a clamp member 56 towards window 10 without damaging tissue edges 14a or 14b, as shown by the exploded view of FIGS. 1B and 3C. Window 10 is located at the bottom of a tissue container 51 shown in FIG. 1B.

Container 51 is a cylinder having an interior sized for receiving compression member 54 and then clamp member 56. The container is received in a holder 50 so that the container's flange 52 is received along annular step 50e. The upper cylindrical portion 50c of the holder 50 is externally threaded so that a retainer 55 internally threaded along wall 55a can screw onto holder 50 to releasably lock clamp member 56 over compression member 54 and window 10 when tissue specimen 14 is present upon window surface 12. Retainer 55 has a central circular opening 55b and two opposing tongues 61. To lock clamp member 56 to container 51 and holder 50, clamp member 56 has a knob portion 57 and an annular lip 58 having two opposing slots 59. For purposes of illustration, only one slot is shown in FIG. 3A, and these slots are not shown in FIG. 1B. In operation, clamp member 56 is inserted into retainer 50 in which slots 59 align with tongues 61 so that the clamp member's annular lip 58 is received along an annular step 60 of container 51. To engage clamp member 56 into a locking relationship with retainer 50, clamp member 56 is turned until slots 59 and tongue 59 no longer align with each other, as shown for example in FIGS. 3A and 3B as will be described below.

Lower cylindrical portion 50a of holder 50 is mountable onto stage 20, as will be described in more detail below. Thus, a releasable locking mechanism is provided to retain clamp member 56 is such position during imaging by objective lens 30 (FIG. 1A). Window 10 may be attached to container 51 along the container's bottom wall or cover 49 having an opening 49a for receiving the window. Window 10 may be rigidly retained to cover 49, such as by adhesive. Thus, container 51 provides a tissue specimen receptacle having window 10 (or 10a as described later) with substantial surface 12 curvature adapted to at least approximate the surface curvature of an edge or edges of a non-histologically prepared tissue specimen 14 desired to be imaged by an optical sectioning microscope via the window when placed thereupon.

The assembly of the container 51 with compression member 54 and clamp member 56 is best shown in FIG. 3C.

Compression member 54 may be made of material which deforms in response to applied pressure, such as Styrofoam. Preferably, the bottom surface 56a of clamp member 56, the top and bottom surfaces 54a and 54b, respectively, of compression member 54, are of the same curvature as the curvature of window surface 12 to facilitate applying uniform pressure towards window 10. Compression member 54 thus is located between the bottom of clamp member 56 and window 10, such that compression member 54 gently compresses while applying pressure upon the tissue specimen 14 against window 10. The compression member 54 may contact areas of the window around the tissue specimen 12.

Figure 2:
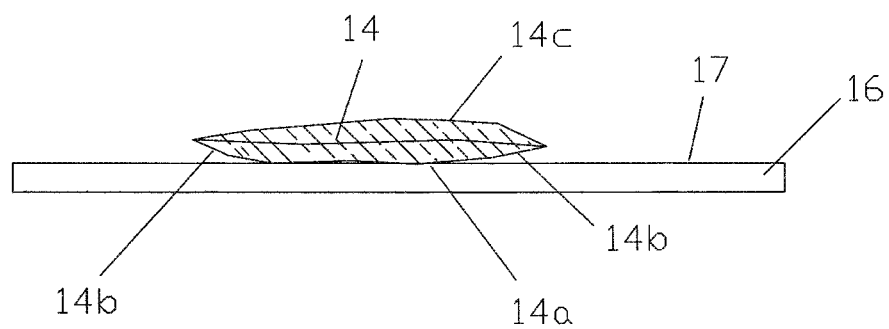
FIG. 2 is a cross-sectional view of a planar window of the prior art rather than the window of FIG. 1A with the same specimen as FIG. 1A to show the advantage of the window utilized by the stage of the present invention.

The window 10 of the present invention solves the problem with optical imaging of a tissue specimen for Mohs surgery in that the tissue specimen is generally thick, for example 2-3 mm, to enable optically imaging of all edges of interest along tissue edges 14a and 14b if such tissue specimen 14 was present on a planar window rather than window 10 of the present invention. For example, FIG. 2 shows an example of the same tissue specimen 14 now on a planer window 16, where tissue edge 14b is non-planar and hence cannot contact surface 17 of window 16 by mere placement upon window 16. Even by applying pressure along the top edge 14c towards window 16 does not readily enable the tissue edges 14b to being planar against surface 17 as needed for proper optical sectional imaging of the tissue specimen through window 16 without additional manipulation of the tissue specimen as described earlier in connection with U.S. Pat. No. 6,411,434. This problem is avoided by providing window 10 with a surface curvature 12 following the expected shape of the edges of a tissue specimen of imaging interest.

Figure 3D:
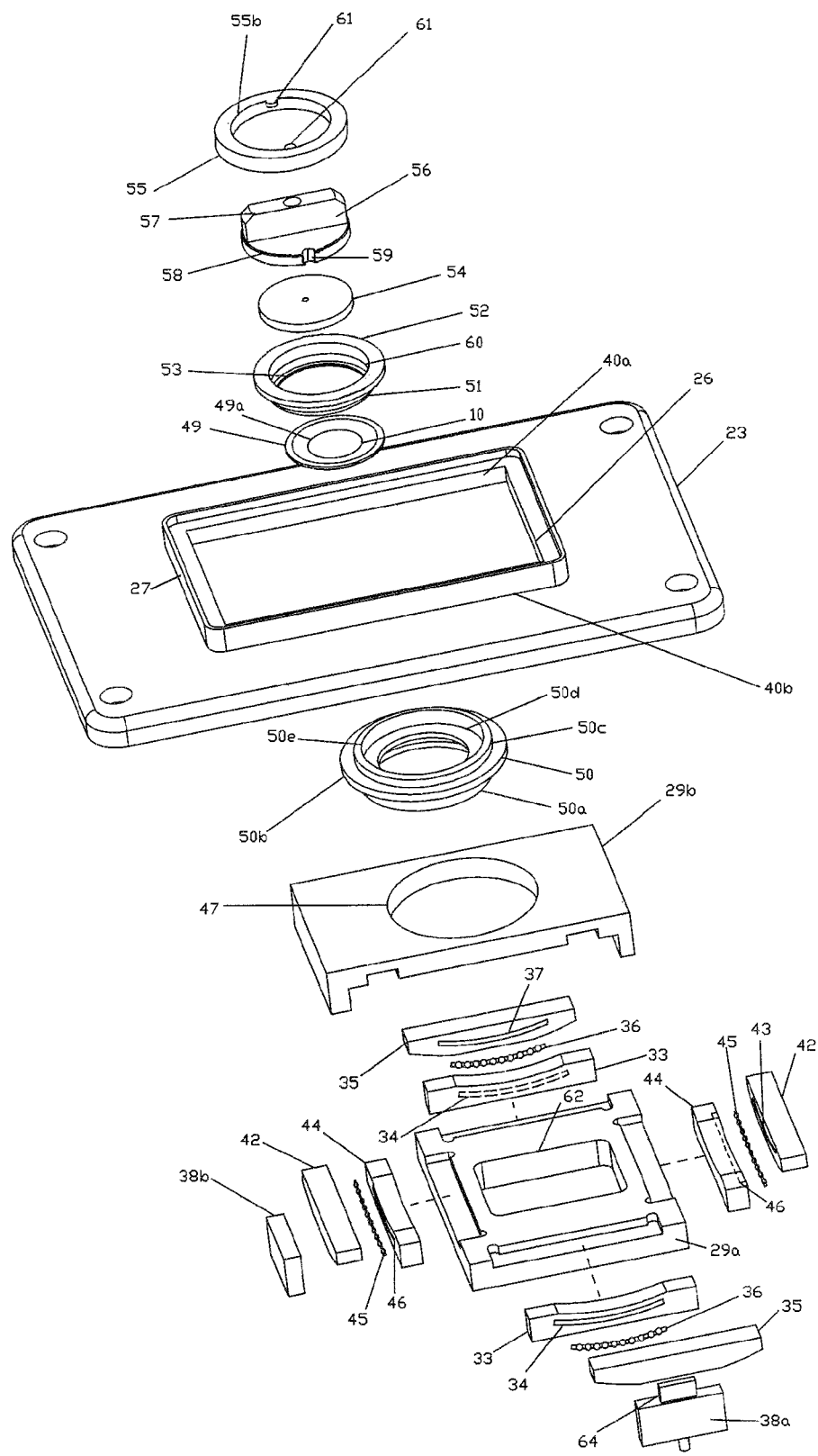
FIG. 3D is an exploded view of the carriage of the stage of FIGS. 3A-C.
Figure 3E:
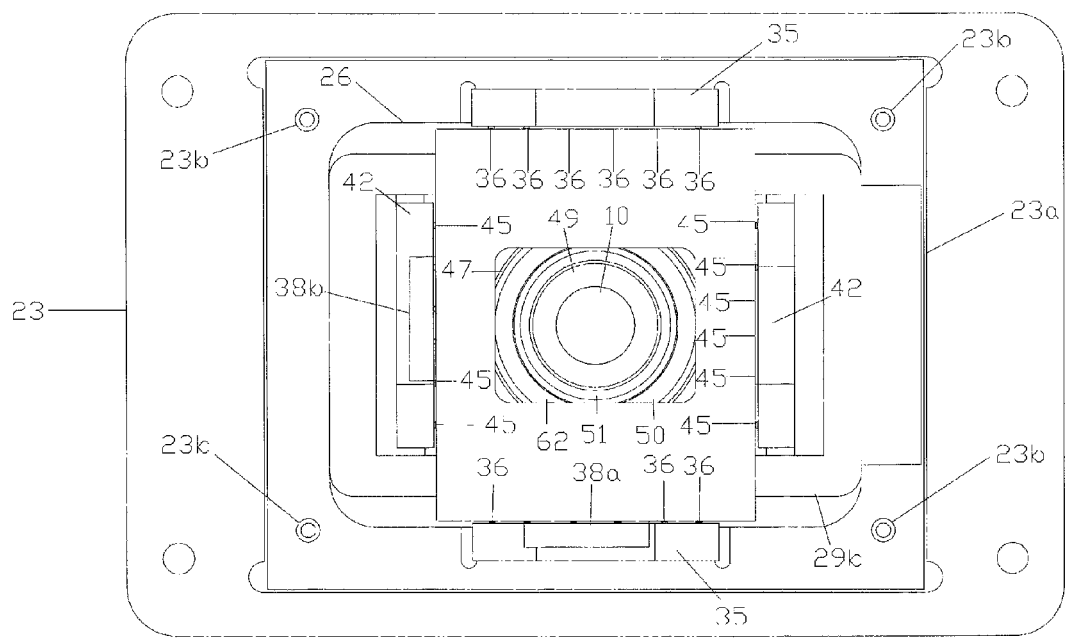
FIG. 3E is a bottom view of the stage of FIG. 3A taken from below from the carriage with the microscope head removed.

Referring to FIGS. 3A, 3B, and 3C, a stage 20 of the present invention is shown utilizing window 10 of FIG. 1A. Stage 20 has a base member (or lower platform) 22 supporting an (upper) platform 23 upon four posts 24. Post 24 may be an assembly of one or more shafts for attaching the four corners of platform 23 to base 22 as illustrated. Platform 23 has a rectangular opening 26 extending through a carriage mounting plate 23a attached under platform 23 by screws 23b. Extending from platform 23 about opening 26 is an optional wall 27, as shown in FIG. 3A and in cross-section in FIGS. 3B and 3D. A carriage 28 is mounted for example to platform 23, via mounting plate 23a, for movement along the two rotational axes described earlier that follow the radius of curvature of surface 12 of window 10. In this manner, different locations along window 10 are presentable to objective lens 30 mounted for example in a tube 30a below carriage 28. However other lens mounting mechanisms may be used.

Preferably, objective lens 30 is part of the optics (or optical system) of a confocal microscope head 30b attached to base 22. Objective lens 30 may represent an assembly of lens or optical surfaces in tube 30a, and is shown schematically in FIG. 3C as a single lens within tube 30a. The last optical surface of lens 30 is denoted at 30c. The objective lens 30 is preferably corrected for the base thickness of window 10. The gap between window 10 and the last optical surface 30c of objective lens 30 in tube 30a can be filled with an index matching liquid or gel, or may filled with air. The particular optics utilized in the objective lens assembly is selected in accordance with the optical material within the gap, the thickness of the window 10 and the curvature of the window 10 to enable optically corrected imaging of the specimen at or near the surface of the window. Optionally, a different objective lens may be utilized for the microscope if the curvature of the window is changed to accommodate different specimen curvatures. Confocal microscope head 30b is connected to a computer system (not shown) for providing optical sectional images at different depths in tissue specimen 14 via window 12, which is transparent to the radiation wavelength(s) using in imaging by the microscope. Examples of confocal microscope heads and associated computer system and display are shown in U.S. Pat. Nos. 5,788,639 and 7,394,592, which are incorporated herein by reference. For purposes of illustration, head 30b is shown by block 30b. Head 30b may also be part of an imaging system for other types of optical sectioning microscopy, such as by two-photon, or optical coherence tomography, Raman microspectroscopy or confocal fluorescence microscopes.

Carriage 28 comprises two carriage members 29a and 29b orthogonally mounted and moveable (slides) with respect to each other and each travels along a different one of two rotational axes, as described earlier. Carriage member 29a has a rectangular opening 62 extending there through, while carriage member 29b has a circular opening 47 receiving tissue container 51 via a holder 50, as described below.

Carriage member 29a has two first track members 33 attached in ledges along opposite ends 40a and 40b of carriage member 29a. Two second track members 35 are attached along opposite ends of rectangular mounting plate 23a, in which each second track members 35 faces one of first track members 33 of carriage member 29a. Carriage member 29b has two third track members 42 attached along the underside of the carriage member 29a along opposite ends thereof. Carriage member 29a has two fourth track members 44 each facing one of third track members 42 of carriage member 29b. Each of the two pairs of first and second track members, and two pairs of third and fourth track members, may for example, mated Gonio Way curved cross roller side assemblies, manufactured by Isotech, Inc, of Hatfield Pa., USA.

To enable movement of the carriage 28 in a first rotational axis, first track members 33 each have a track, groove, or channel 34 curved following the curvature of the window 10 in the first rotational axis. Multiple rotational elements 36 partially extend from each of second track members 35 into track 34 of the first track member 33 facing the second track member 35. Rotational elements 36 may be metal balls captured in pockets or openings along second track member 35 enabling rotational mounting of such balls. Such pockets may be formed in a sleeve 37 along each of second track members 35.

To enable movement of the carriage 28 in a second rotational axis, third track members 42 each have a track, groove, or channel 43 curved following the curvature of the window 10 in the second rotational axis. Multiple rotational elements 45 partially extend from each of fourth track members 44 into track 43 of the third track member 42 facing the fourth track member 44. Rotational elements 45 may be metal balls captured in pockets or openings along track member 44 enabling rotational mounting of such balls. Such pockets may be formed in a sleeve 46 along each of fourth track members 44. Although the rotational movement along two different rotational axes is shown using the illustrated track members, other mechanisms for moving carriage members 29a and 29b along their respective axes may also be used.

Figure 1B:
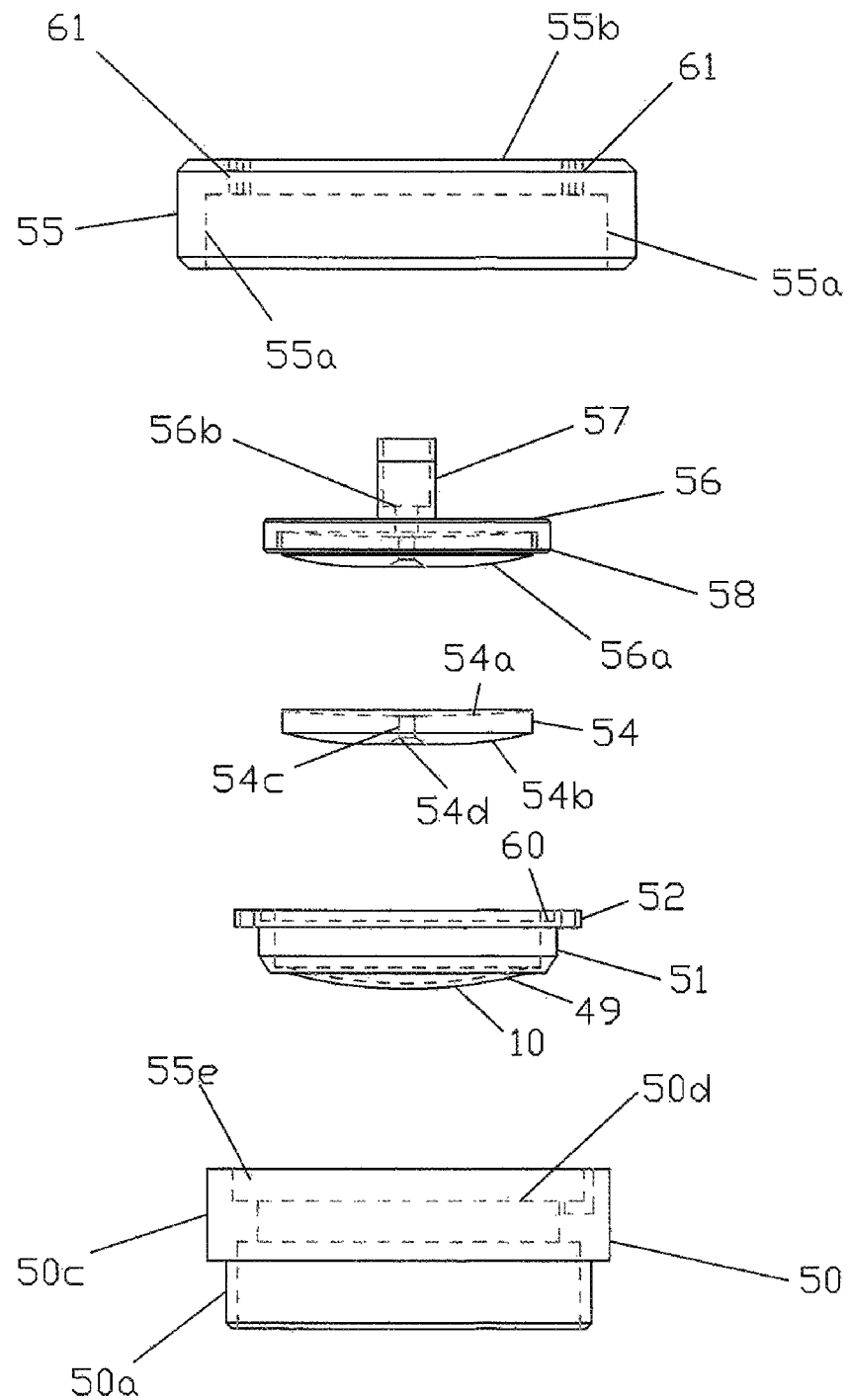
FIG. 1B is an exploded view of a tissue container utilized by the tissue specimen stage of the present invention having the window of FIG. 1A and compression and clamp members receivable for applying pressure upon a tissue specimen against the window.

Circular opening 47 of carriage member 29b receives holder 50 for specimen container 51, as described earlier. Holder 50 is a cylinder with a lower cylindrical portion 50a and an upper cylindrical portion 50c. Lower cylindrical portion 50a has an outer diameter sized to be received in circular opening 47 so that an upper portion 50c extends away from opening 47, as best shown in FIGS. 1B and 3C. The holder 50 may have an outer flange 50b that lies along the top of carriage member 29b around opening 47, or 50b may be a ring clamp. To fix holder 50 to carriage member 29b, opening 47 may have threads and holder 50 may screw into carriage member 29b via a threaded outer lower cylindrical portion 50a. Alternatively, holder 50 may be fixed by other means, such a welded or adhesive.

Upper portion 50c of holder 50 has an opening 50d for receiving tissue container 51 so that an outer flange 52 of container 51 is located along an annular step about opening 50d of upper portion 50c. Below its flange 52, container 51 preferably has exterior threads which enable container 51 to be tightened into threads along interior surface of specimen holder 50 via opening 50d. This enables container 51 to be easily inserted or removed from stage 26, as needed, with or without a tissue specimen being clamped against window 10 via compression member 54. A fluid matched to the index of refraction of the tissue surfaces along edges 14a and 14b is preferably provided upon window surface 12 prior to placing the tissue specimen in container 51. A hole or bore 56b extends through clamp member 56. Clamp member 56 is clamped by retainer 55 against window 10 via compression member 54. Air and/or liquid is allowed to escape, via a bore or hole 54c via its' concave middle opening 54d which communicates such and/or liquid via with bore or hole 56b of clamp member 56 so as to not trap air bubbles with the tissue specimen 10 and give uneven compression. Also, the compression member's concave middle opening 54d provides a relief of pressure upon the middle of the tissue specimen 14 so that pressure is directed more towards tissue specimen edges 14b where it is needed more.

Tube 30a with objective lens 30 is disposed with respect to carriage 28 to extend through openings 47 and 62, of respective carriage members 29b and 29a, into the interior of lower cylindrical portion 50a of holder 50 to view tissue specimen 14 via window 10 when container 51 is screwed into holder 50. Objective lens 30 is directed toward window 10 being carried upon carriage 28 along optical axis 31, as described earlier. Carriage 28 may be rotationally tilted following the curvature of window surface 12, as shown for example in FIG. 3C (see angle between arrows 11a with respect to optical axis 31), so that any location of the tissue specimen 14 in contact with window surface 12 can be imaged via objective lens 30 while maintaining the same optical geometry. The distance or gap along optical axis 31 may be varied by the confocal microscope along a z axis, via a motor not shown, towards or away from window 10 for focusing at different depths in tissue specimen 14 upon window 10, as typical of a confocal microscope. A fluid matched to the index of refraction of the tissue surfaces 14a and 14b is preferably provided upon window surface 12 prior to imaging the tissue specimen 14 through window 10. Selection of the index of refraction fluid may be as described in U.S. Pat. No. 6,856,458.

To drive motion of carriage members 29a and 29b along to enabling different locations about window 10 to be in view of objective lens 30 and thus enables different parts of the tissue specimen on window 10 to be optimally sectioned by the microscope via its' lens 30. Two piezoelectric motors 38a and 38b are provided. Motor 38a is attached to carriage member 29a having an actuator member 64 against member 35 so as to move carriage member 29b with respect to carriage member 29a along first rotational dimension. Motor 38b is attached to carriage member 29a having an actuator member 66 against member 42 so as to move carriage member 29a with respect to carriage member 29b along the second rotational dimension. For example, piezoelectric motors 38a and 38b may each be Piezo LEGS® Motor of Micromo, Inc. which utilize a walking drive to provide actuator members 64 and 66, respectively, or a PILine® Ultrasonic Piezo Motor manufactured by OEM Motors, having a guide rod to provide actuator members 64 and 66, respectively.

Figure 4:
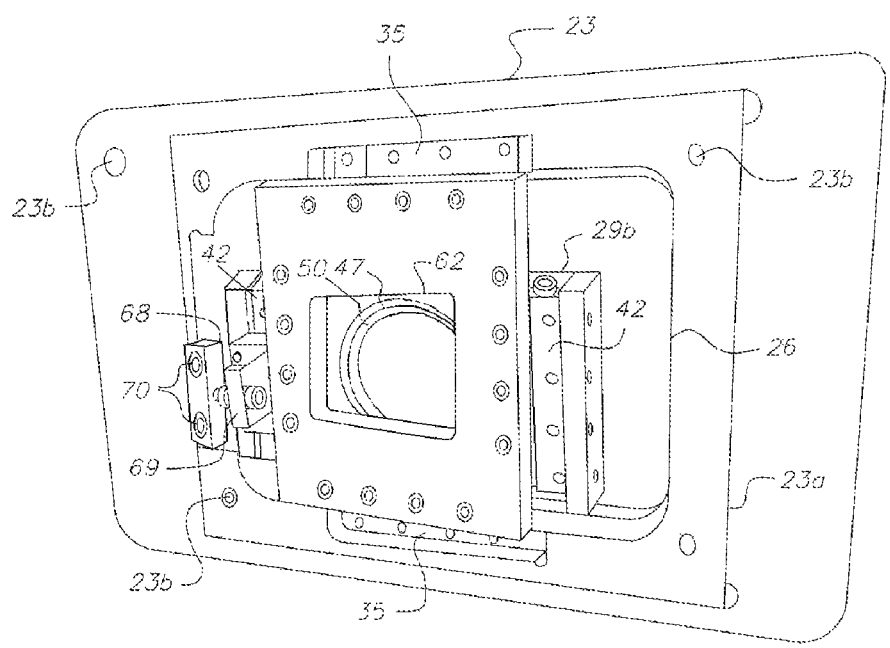
FIG. 4 is a bottom perspective view of the stage of FIG. 3A with the microscope head and motors for driving the stage removed, and a coupler attachable to an x-y translation mechanism.
Figure 5:
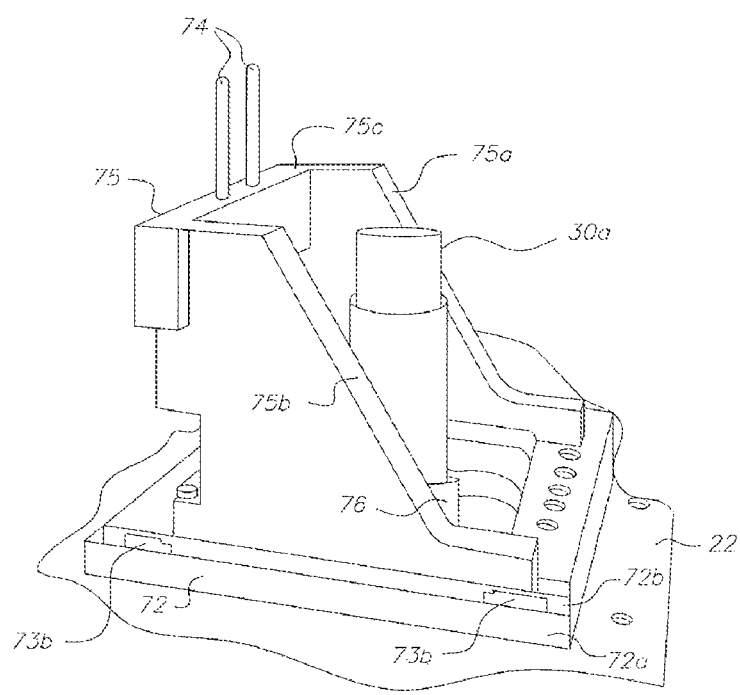
FIG. 5 is a perspective view of an x-y translation mechanism attachable to the coupler of FIG. 4.
Figure 6:
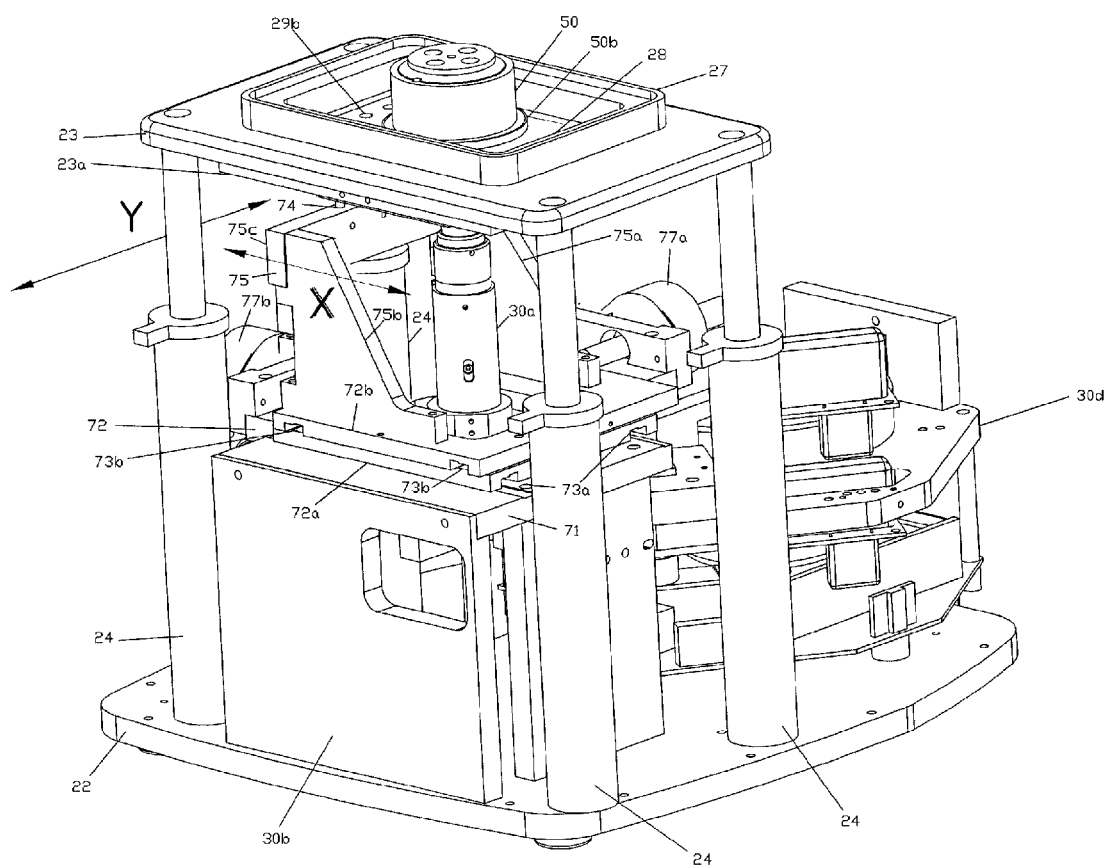
FIG. 6 is a perspective view showing the coupler of FIG. 4 mounted to shafts extending from the x-y translation mechanism of FIG. 5 for moving the carriage of the stage.

Referring to FIGS. 4, 5, and 6, carriage 28 movement is enabled without motors 38a and 38b by providing a coupler 69 fixed to carriage member 29a in which movement of the coupler along the x, y orthogonal axes correspond with carriage members 29a and 29b movement when they move along their respective rotational axes. Coupler 69 has a socket into which is received a ball extending from another coupler 68 where the ball is rotatable in the socket, as typical of ball and socket rotational mounting. Coupler 68 has two mounting holes 70 extending there through. Alternatively, coupler 69 has a ball received into a socket of coupler 68.

FIGS. 5 and 6 shows a x-y translation mechanism or stage 72 having a plate 72a movable along the x-axis, and a plate 72b movable along the y axis, in which platform 23 and posts 24 are shown removed in FIG. 5 and present in FIG. 6. Two linear guides and/or tracks 73a along the x axis enable movement of plate 72a along a stationary support plate 71, while two linear guides and/or tracks 73b between plates 72a and 72b enable movement of plate 72b with respect to plate 72a. Motors 77a and 77b drive plates 72a and 72b bidirectionally along their respective axes. Objective lens 30 with tube 30a extends from microscope head 30b through an opening 76 of stage 72 and is fixed in position with respect to stage 72. Attached to plate 72b is a structure 75 having two vertical rods 74 which extend through two holes 70 of coupler 68 as shown in FIG. 4. Structure 75 is provided by two flanges 75a and 75b (FIG. 5) extending from plate 72b which are connected by a horizontal member 75c into which vertical rods 74 are fixed. Movement of the x-y translation mechanism 72 along the x-axis in x direction effects movement of carriage member 29a and along the y-axis in y direction effects movement of carriage member 29b along their respective rotational axes, as shows by arrows labeled X and Y in FIG. 6. Coupler 68 is rotationally mounted so that it rotationally pivots with respect to rods 74 as motion is applied by translation mechanism 72 via rods 74 (and couplers 68 and 69) to stage 28. Electronics 30d of the microscope is also shown in FIG. 6.

Window 10 is rotationally movable, via carriage 28 with respect to platform 23, along two rotational axes utilizing piezoelectric motors 38a and 38b, or motors 77a and 77b, which operate responsive to applied signal(s), such as provided by the computer system of the microscope to enable a user utilizing controls (microscope user interface, such as keyboard, touch screen, GUI, mouse or other pointing device) to select different locations along tissue specimen to obtain optical sectional images thereof. Cells and tissue structure(s) of optical sectional images captured may be viewed by a pathologist to determine whether tissue along tissue specimen surfaces 14a and 14b (tissue margins) at selected locations are cancerous or not so as to direct additional removal of tissue from the patient, if needed.

Figure 7A:
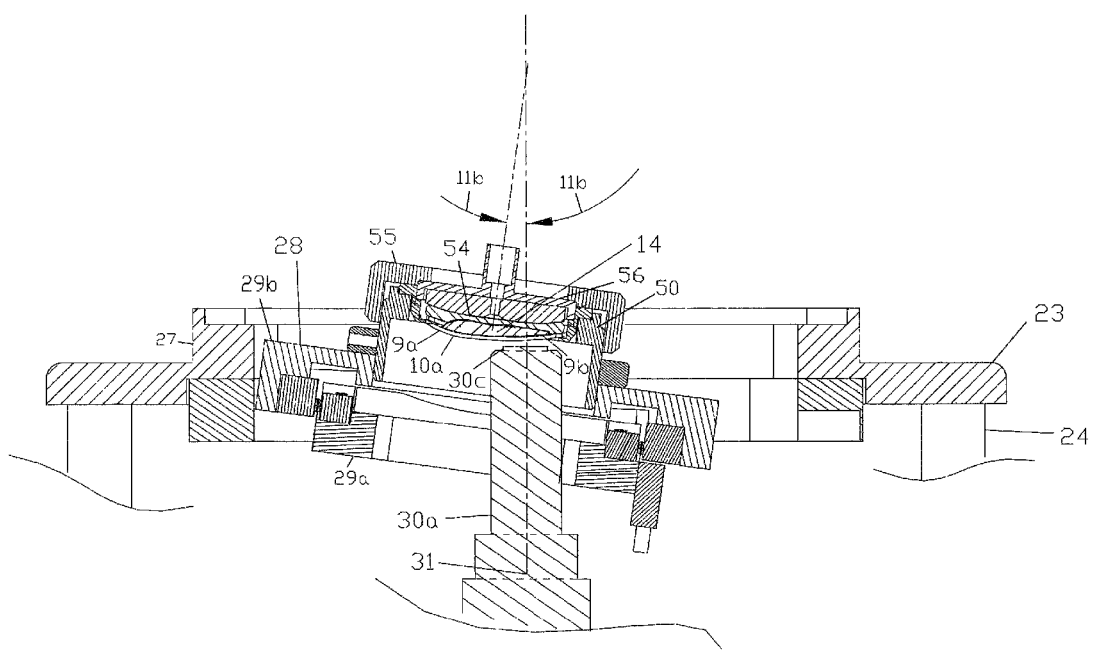
FIGS. 7A and 7B are partial cross-sectional views similar to FIG. 3C showing two different rotational positions of the stage and window with respect to the objective lens in the case of a window having aspheric surface curvature rather than rotationally symmetric surface curvature as shown for example in FIG. 1A.
Figure 7B:
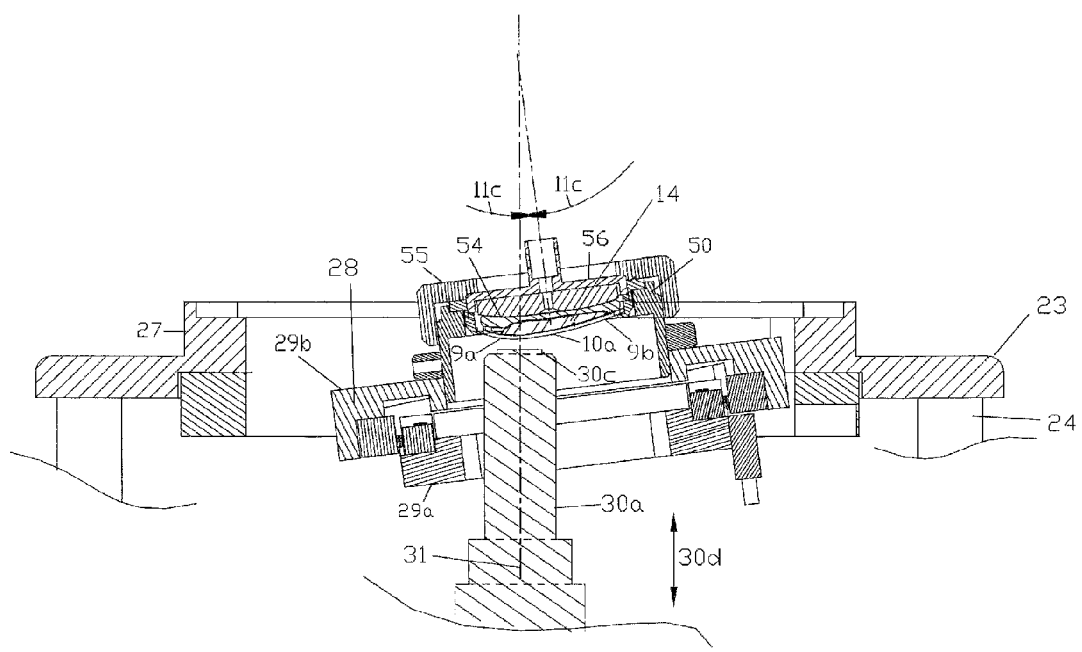

Although a rotational symmetric concave window 10 is shown providing a curved pocket for a tissue specimen 14 (see e.g., FIG. 1A), window may have other curvatures each shaped for the particular curvature of tissue specimen edges of interest for pathological examination, such as shown for example in FIGS. 7A and 7B.

FIGS. 7A and 7B are similar to FIG. 3C, but have an aspheric window 10a shown in two different rotational positions of carriage 28 and window 10a with respect to the objective lens 30. Unlike rotationally symmetric window 10 which has the same radius of curvature along its entire surface, or at least along the part thereof upon which the tissue specimen 14 is locatable, window 10a has an aspheric surface curvature, in which two or more regions or parts of the window may have different radius of curvature. In this example, there are two regions 9a and 9b, where region 9b is steeper than region 9a. The axes of rotation of carriage 28 correspond to radius of region 9b. In this manner, the aspheric window 10a adjusts for the stepper edges of a tissue specimen 14 facing window region 9b, so that such edges readily lie against window 10a when compressed, where such edges are steeper compared with the central area or edges of the tissue specimen. Region 9b being steeper so that the edge 14b climbs quicker as window 10a rotates up along region 9b of window 10a, i.e., the radius of window 10a reduces along region 9b from region 9a. The user can thus select one of multiple different windows with different surface curvatures (from symmetric to aspheric or different steeped region(s)) in accordance with the shape and size of the tissue cuts along the edges of interest when the tissue specimen is placed in the tissue container assembly of FIG. 1B. As shown in FIGS. 7A and 7B, window 10a has a first surface with regions 9a and 9b, and a second surface opposite such first surface which preferably follows the curvature of the first surface, where such second surface is presentable to objective lens 30.

Upon the view of objective lens 30 changing with window 10a motion between such regions, as in the case when the window 10a position changes from that of FIG. 7A (see angle between arrows 11b) to that shown in FIG. 7B (see angle between arrows 11c), the optical geometry is adjusted accordingly, i.e., the distance between the objective lens 30 and the window 10a is adjusted to maintain the same optical geometry between the window 10a and the objective lens 30 so that focus is maintained as window 10a moves with respect to objective lens 30. This may be achieved by moving objective lens 30 towards or away from window 10a along optical axis 31 as denotes by arrow 30d with window motion. The microscope head 30b has a motor which can move the entire tube 30a bidirectionally along axis 31 to maintain focus as regions change. Such movement is typical of focusing of optical sectioning microscopes. For example, in the case of a confocal microscope see earlier incorporated by reference U.S. Pat. No. 7,394,592. Optionally, the entire platform 23 supporting window 10a, via carriage 28, towards or away from objective lens 30 so as to maintain focus. To move the entire platform, posts 24 are each adjustable in height along axis 30d. Each post 24 may represents two cylinders in which the upper cylinder is slidable through the lower cylinder, and upper cylinder can be pneumatically or by a gear drive motor moved up and down under control of the microscope as needed to control platform 23 height.

Different windows may thus be selected for the shape of such edges desired to be imaged by the optical sectioning microscope. The aspheric (non-spherical) window is especially useful to account for the difference in thickness from the middle to the edge with the radius of curvature changing from the middle out. Other windows may also be used, such as spherical or approximately spherical window into which a general spherical tissue specimen is contained and rotated along two rotational axes to image edges against the window. Motion of the non-spherical window 10a is controlled such that the window surface adjacent to the tissue specimen is locally perpendicular to the optical axis of the objective lens 30. The distance between the window 10a and the objective lens 30 is adjusted so that the image of the section being captured is nominally at the window surface adjacent to the tissue specimen. When it is desired to image inside the tissue specimen an offset can be added to provide sectional imaging inside the tissue specimen.

From the foregoing description, it will be apparent that a window having surface curvature adapted to the shape or surface curvature of the edges of a non-histologically prepared excised tissue specimen, and a stage and method for rotating such window with respect to an objective lens of an optical sectioning microscope have been provided.

Variations and modifications in the herein described window, stage, and method in accordance with the invention will undoubtedly suggest themselves to those skilled in the art. Accordingly, the foregoing description should be taken as illustrative and not in a limiting sense.

The invention claimed is:

1. A tissue specimen stage for a microscope having an objective lens for imaging tissue comprising:
   a window having a first surface with a spherical or non-spherical concave curvature, and a second surface opposite the first surface which follows the curvature of the first surface, wherein an excised tissue specimen is locatable on the first surface;
   a carriage to which said window is mounted; and
   a platform supporting the carriage and presenting said second surface of the window to the objective lens of a microscope, wherein said carriage is mounted to said platform for movement along two rotational axes so that said carriage movement follows the curvature of at least part of the first surface of the window while maintaining the optical geometry of the window with respect to the objective lens.

2. The tissue specimen stage according to claim 1 wherein said curvature of said first surface is a rotationally symmetric concave curvature.

3. The tissue specimen stage according to claim 1 wherein said curvature of said first surface is aspheric.

4. The tissue specimen stage according to claim 1 wherein curvature of said first surface forms a pocket for receiving said tissue specimen.

5. The tissue specimen stage according to claim 1 wherein said curvature of said first surface is spherical.

6. The tissue specimen stage according to claim 1 further comprising means for moving said carriage along said rotational axes.

7. The tissue specimen stage according to claim 1 further comprising a translation stage moveable along two orthogonal axes which corresponds to said two rotational axes of said carriage, in which said translation stage is mechanically coupled to said carriage to enable movement of said translation stage to move said carriage along one or both of said rotational axes.

8. The tissue specimen stage according to claim 1 wherein said carriage further comprises a first carriage member and a second carriage member in which each of said first and second carriage members is movable along a different one of said two rotational axes.

9. The tissue specimen stage according to claim 8 wherein said first carriage member is rotationally mounted to said platform for movement along a first of said rotational axes with respect to the platform, and said second carriage member is rotationally mounted to said first carriage member for movement along the second of said rotational axes.

10. The tissue specimen stage according to claim 9 wherein said first carriage member is motor driven along a first of said rotational axes with respect to the platform, and said second carriage member is motor driven along the second of said rotational axes with respect to the first carriage member.

11. The tissue specimen stage according to claim 9 further comprising a translation stage moveable along two orthogonal axes which correspond to said two rotational axes, said translation stage is mechanically coupled to said second carriage member to enable movement of one or both of said first and second carriage members along their respective rotational axes.

12. A tissue specimen receptacle comprising:
   a window with a first surface with a spherical or non-spherical concave curvature, and a second surface opposite the first surface which follows the curvature of the first surface, wherein the first surface is adapted to at least approximate a portion of a curved surface of a non-histologically prepared tissue specimen when placed thereupon in which the tissue specimen is imagable through said window by an optical sectioning microscope, wherein the window is configured to rotate along two rotational axes such that an optical geometry of the window with respect to an objective lens of the microscope is maintained.

13. The tissue specimen receptacle according to claim 12 wherein said portion represents an edge along the tissue specimen where a cut was made in order to excise the tissue specimen from a patient.

14. The tissue specimen receptacle according to claim 12 further comprising means for compressing said tissue specimen against said window when said tissue specimen is present on said window.

15. The tissue specimen receptacle according to claim 12 wherein said first surface of said window is a rotationally symmetric concave curvature.

16. The tissue specimen receptacle according to claim 12 wherein said first surface of said window is spherical.

17. The tissue specimen receptacle according to claim 12 wherein said first surface of said window is aspheric.

18. The tissue specimen receptacle according to claim 12 further comprising a wall having an opening along which said window is disposed.

19. A method for presenting an excised tissue specimen to an objective lens of a microscope comprising the steps of:
   rotating a window having a first surface with a spherical or non-spherical concave curvature and a second surface opposite the first surface which follows the curvature of the first surface, wherein an excised tissue specimen is locatable on said first surface, along two rotational axes following at least part of said curvature of said first surface; and
   supporting said window with respect to an objective lens of a microscope, in which said rotating step enables the optical geometry of the window to be maintained between said window with respect to the objective lens.

20. An apparatus for presenting an excised tissue specimen to an objective lens of a microscope comprising:
   a window having a first surface with a spherical or non-spherical concave curvature, and a second surface opposite the first surface which follows the curvature of the first surface, wherein an excised tissue specimen is locatable on said first surface; and
   a stage for moving said window along two orthogonal rotational axes to follow the curvature of at least part of the first surface of the window while maintaining the optical geometry of the window with respect to the objective lens.

* * * * *